United States Patent
Smith et al.

(10) Patent No.: US 9,829,356 B1
(45) Date of Patent: Nov. 28, 2017

(54) METHOD AND APPARATUS FOR MULTI-CHANNEL SENSOR INTERFACE WITH PROGRAMMABLE GAIN, OFFSET AND BIAS

(71) Applicant: Exar Corporation, Fremont, CA (US)

(72) Inventors: Steven Smith, Lovell, ME (US); Dale Wedel, Fremont, CA (US)

(73) Assignee: Exar Corporation, San Jose, CA (US)

( * ) Notice: Subject to any disclaimer, the term of this patent is extended or adjusted under 35 U.S.C. 154(b) by 0 days.

(21) Appl. No.: 15/187,730

(22) Filed: Jun. 20, 2016

(51) Int. Cl.
  *G01D 18/00* (2006.01)
  *G01D 5/16* (2006.01)

(52) U.S. Cl.
  CPC ............ *G01D 18/008* (2013.01); *G01D 5/16* (2013.01)

(58) Field of Classification Search
  CPC ............................ G01D 18/008; G01D 5/16
  USPC ....................................................... 702/104
  See application file for complete search history.

(56) References Cited

U.S. PATENT DOCUMENTS

| | | | | |
|---|---|---|---|---|
| 4,303,984 A | * | 12/1981 | Houvig | G01D 3/022 374/171 |
| 7,577,539 B2 | * | 8/2009 | Hubanks | G01D 18/008 324/207.25 |

* cited by examiner

*Primary Examiner* — Harry W Byrne
(74) *Attorney, Agent, or Firm* — Pillsbury Winthrop Shaw Pittman LLP

(57) ABSTRACT

A highly integrated programmable sensor interface with improved sensor signal calibration and conditioning functions is described. The programmable sensor interface according to the present invention sensor interface provides programmable gain, digital offset correction and bias for one or more signal channels on one chip on a per channel basis. According to another aspect of the invention, the sensor interface provides reference voltage and sensor biasing by using an on-chip precision voltage regulator. According to one aspect of the invention, multiple inputs are multiplexed and each is applied to a variable gain instrumentation amplifier, which connects to the output. The offset of a given channel is controlled by an on-chip DAC which has multiple digital storage registers, allowing each channel to have a unique, stored offset. Offsets and gains are programmed externally.

14 Claims, 3 Drawing Sheets

METHOD AND APPARATUS FOR MULTI-CHANNEL SENSOR INTERFACE WITH PROGRAMMABLE GAIN, OFFSET AND BIAS

FIELD OF THE INVENTION

Described are a method and apparatus for an integrated sensor interface, and particularly a sensor interface that provides programmable calibration and signal conditioning for one or more channels of input signals.

BACKGROUND OF THE INVENTION

Many force and pressure sensors utilize a strain gauge or Wheatstone bridge circuit. The resistive elements in the bridge change resistance in response to changes in sensed condition, such as in pressure or acceleration, or mechanical strain, which in turn cause the electrical output (e.g., voltage or current) to change corresponding to a change in the sensed condition.

Typical bridge sensors have a differential output signal (Vo+ and Vo−). Ideally, the unloaded bridge output is zero (Vo+ and Vo− are identical). However, inexact resistive values result in a difference between Vo+ and Vo−. This bridge offset voltage can be substantial and vary between sensors causing decreased system accuracy.

Different designs and approaches have been developed to improve the sensitivity of bridge sensors by calibrating them more accurately. Some approaches include providing both offset correction and gain control of the sensor signals. Some designs attempt to address the wide range of sensor data by having on board microprocessor to achieve programmable compensation and calibration. However, as the deployment of small portable devices such as smartphone gets ever broader and the user demand for having more functions and features (thus more sensors) on small portable devices keeps increasing, the need in the art for a solution for highly integrated and versatile sensor conditioner or interface design both in terms of footprint and functionality remains.

SUMMARY OF THE INVENTION

The present invention discloses a solution to the above discussed problem. The present invention is directed to methods and apparatuses of a highly integrated programmable sensor interface that provides programmable gain, offset and bias for multiple signal channels on one chip. Specifically, the programmable sensor interface according to the present invention provides digital offset correction for one or more differential input channels. The present invention provides per channel programmable offset, programmable gain, reference voltage and sensor biasing using an on-chip voltage regulator. According to one aspect of the invention, multiple inputs are multiplexed and each is applied to a variable gain instrumentation amplifier, which connects to the output. The offset of a given channel is controlled by an on-chip DAC which has multiple digital storage registers, allowing each channel to have a unique, stored offset. Offsets and gains are programmed externally. According to another aspect of the invention, the sensors may be biased by using a precision voltage regulator.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements.

Moreover, where certain elements of the present invention can be partially or fully implemented using known components, only those portions of such known components that are necessary for an understanding of the present invention will be described, and detailed descriptions of other portions of such known components will be omitted so as not to obscure the invention.

Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
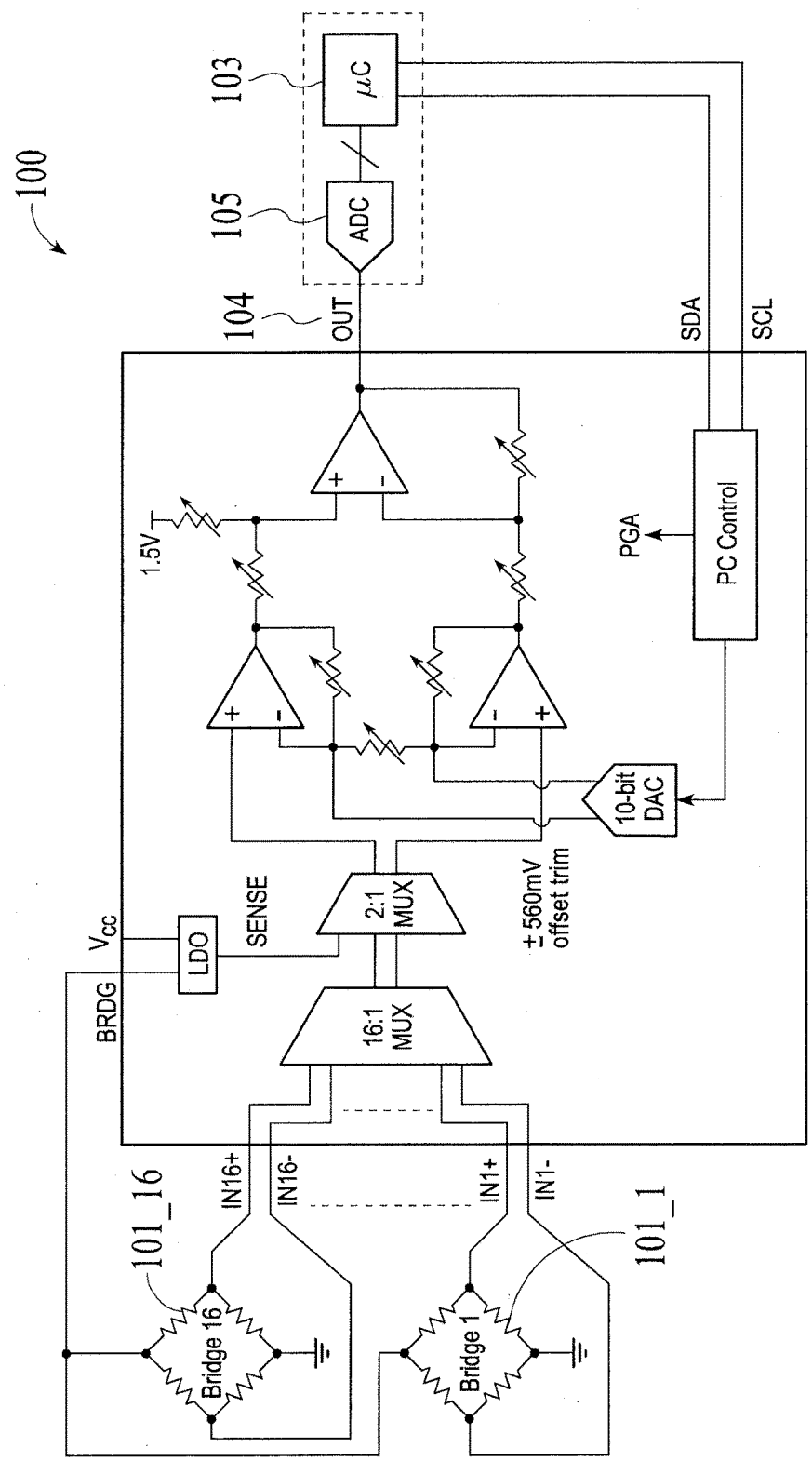
FIG. 1 is a block diagram demonstrating an application of an embodiment of the invention.

Referring now to FIG. 1, a simplified block diagram illustrates a sensor signal conditioner or sensor interface 100 designed to be coupled to multiple bridge sensors 101_1, 101_2, . . . 101_16 and a microcontroller 103. The expressions "sensor signal conditioner" and "sensor interface" are used interchangeably herein. The sensor interface 100 preferably takes in multiple differential analog signals and serial control data from the microprocessor 103 as input, one analog output 104 and one LDO output (106), in order to provide versatility across many applications. Direct interfacing to microprocessor controllers is facilitated via an I2C serial digital interface. The sensor interface 100 is preferably capable of running in low-voltage (0-5.5V) systems when it is combined with an external microcontroller 103 or field-programmable gate array (FPGA). In FIG. 1, the ADC 105 is shown as a distinct component that connects sensor interface 100 and the microcontroller 103. However, in some embodiments, ADC 105 can be integrated into sensor interface 100, or in the alternative, into the microcontroller 103.

Figure 2:
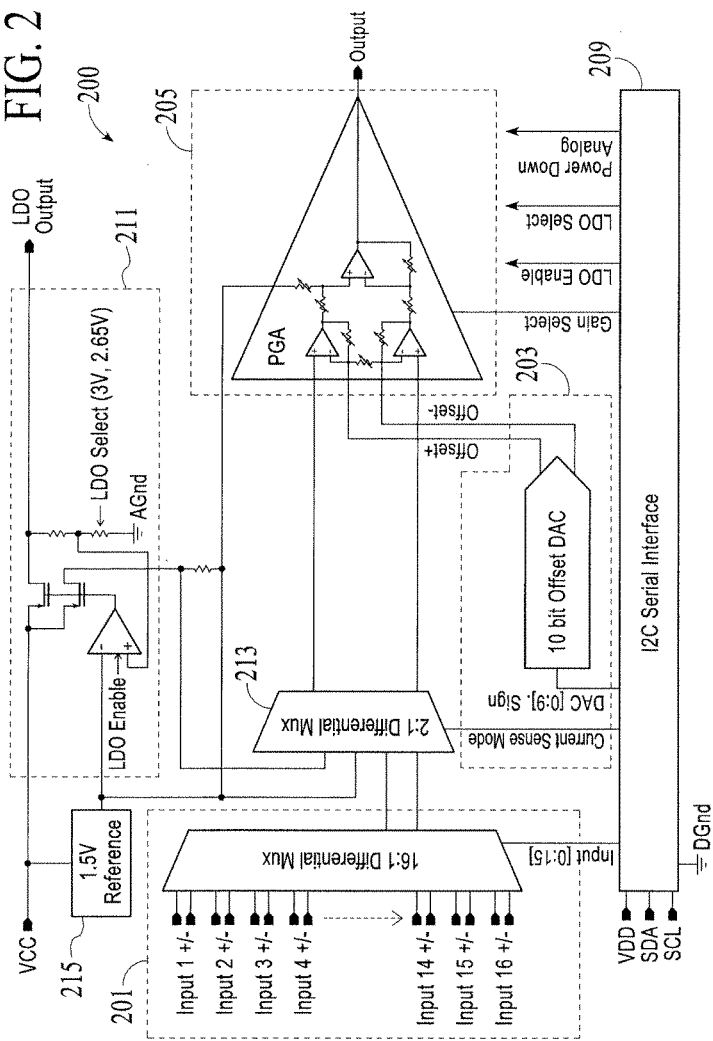
FIG. 2 is a block diagram illustrating the components of an embodiment according to the invention.

Referring now to FIG. 2, a block diagram illustrates the components of an embodiment of a sensor interface according to the invention. The sensor interface 200 preferably includes a multiplexer block 201, an Offset block 203 and a programmable gain instrumentation amplifier block 205. The multiplexer block receives the sensor output signals Input 1+/−(207_1), Input 2+/−(207_2), . . . Input 16+/− (207_16) from the bridge sensors 101 (not shown). An I2C interface 209 controls the many functions and features of the sensor interface 200.

Each bridge sensor connected to the sensor interface 200 has its own inherent offset that if not calibrated out can decrease sensitivity and overall performance of the sensor system. The on-chip DAC 203 introduces an offset into the instrumentation amplifier (PGA) 205 to calibrate the offset voltage generated by the sensors. In some embodiments of the interface sensor according to the invention, an independent offset can be set for each of the input channels 207. Only the offset voltage of the active channel is applied to the programmable gain instrumentation amplifier 205.

In some embodiments of the interface sensor according to the invention, the programmable gain instrumentation amplifier can offer 8 selectable gains from a predefined range (e.g., 2V/V to 760V/V) to amplify the signal such that it falls within the input range of the ADC 105.

In some embodiments of the interface sensor according to the invention, the Sensor Interface also includes an integrated LDO 211 that can provide a regulated voltage to power the input bridge sensors. As in FIG. 2, the integrated LDO 211 provides a selectable regulated voltage between 3V and 2.65V.

In some embodiments of the interface sensor according to the invention, LDO 211 has two operation modes: sleep mode and regular mode. The LDO 211 can be set to turn off when the sensor interface is in Sleep Mode to save power.

In some embodiments, the sensor interface 200 also supports current sense mode. In this case, the LDO 211 also provides the ability to monitor the LDO current. As depicted in FIG. 2, an internal 2:1 mux 213 allows a voltage proportional to the LDO current to be present at the output. Once all channels have been calibrated, the LDO current can be used to indirectly monitor any voltage or resistive changes seen by the inputs.

In some embodiments, the sensor interface 200 also includes an internal reference voltage 215 that is used by the internal LDO circuitry 211 and used to set the reference voltage for the programmable gain instrumentation amplifier 205.

In some embodiments, the sensor interface 200 also contains an I2C compatible serial interface 209. The external microprocessor programs the sensor interface through the I2C serial interface 209 for conditioning multiple sensor signals. The various functions the sensor interface performs include: input selection, gain selection, offset correction, LDO Enable/select, Current Sense Mode, Sleep Mode (Analog Power Down) and many other functions.

The following sections describe each of these functions in more detail.

I2C Bus Interface

The I2C-bus interface consists of two lines: serial data (SDA) and serial clock (SCL). The sensor interface works as a slave and supports both standard mode transfer rates (e.g., 100 kbps) and fast mode transfer rates (e.g., 400 kbps) as defined in the I2C-Bus specification. The I2C-bus interface follows all standard I2C protocols.

Figure 3:
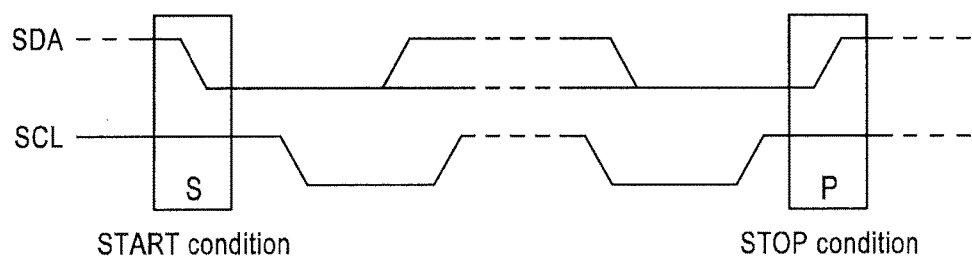
FIG. 3 is a timing diagram of the START condition and STOP condition of the I2C interface on a sensor interface according to the invention.

The sensor interface implements a basic I2C access cycle that consists of: a start condition, a slave address cycle, Zero, one, or two data cycles—depending on the Sensor Interface on-chip register accessed, and a stop condition. FIG. 3 illustrates an I$^2$C start and stop conditions that may be implemented according to one aspect of the invention.

During the Start Condition cycle, the external microcontroller initiates data transfer by generating a start condition. The start condition is when a high-to-low transition occurs on the SDA line while SCL is high, as shown in FIG. 3.

During the slave Address Cycle after the start condition, the first byte sent by the microcontroller is the 7-bit address and the read/write direction bit R/W on the SDA line. If the address matches the sensor interface's internal fixed address, the sensor interface will respond with an acknowledgement by pulling the SDA line low for one clock cycle while SCL is high.

During the Data Cycle after the master detects this acknowledge, the next byte transmitted by the master is the sub-address. This 8-bit sub-address contains the address of the register to access. The sensor interface Register List is shown in Table 1. Depending on the register accessed, there will be up to two additional data bytes transmitted by the master.

During the Stop Condition cycle, to signal the end of the data transfer, the microcontroller generates a stop condition by pulling the SDA line from low to high while the SCL line is high, as shown in FIG. 3.

I2C Bus Addressing

In some embodiments according to the present invention, Sensor Interface 100 uses the higher 7 bits of a byte for addressing the I2C slave on the chip. As an example, the I2C may have an address 0x67 (0110 111X). In this case, a read or write transaction is determined by bit-0 of the byte as indicated by "X". If bit-0 is '0', then it is a write transaction. If bit-0 is '1,' then it is a read transaction.

An I2C sub-address is sent by the I2C master (of the Sensor interface) following the slave address. The sub-address contains the Sensor Interface register address being accessed. [Table 1 provides an example of the Register Information of a sensor interface embodiment according to one aspect of the invention.] After the last read or write transaction, the I2C-bus master will set the SCL signal back to its idle state (HIGH).

Inputs and Input Selection

In some embodiments according to the present invention, Sensor Interface 100 includes 16 differential inputs and a 16:1 differential mux that is controlled by an I2C compatible 2 wire serial interface. If fewer than 16 differential inputs are required, the unused inputs are tied to GND. If single ended inputs are required, the unused inputs are tied to 1.5V.

In some embodiments according to the present invention, Sensor Interface 100 offers a very wide common mode range. For example, Sensor Interface 100 can support a typical input common mode range of 0.6V to 2.4V when running from a 3.3V supply. In most cases, the output voltage swing will be the limiting factor, In some embodiments according to the present invention, inputs are selected via a slave I2C interface (e.g., 203 of FIG. 2) using one of 16 register addresses, such as 0x10 through 0x1F, When the sensor interface is powered-up, the default input may be selected as Channel 1. The example below illustrates how to select Channel 5.

In Step 1, a microcontroller (e.g., 103 of FIG. 1) through a Master I2C (off the sensor interface) interface sends a start signal to the slave I2C interface (e.g., 203 of FIG. 2). In Step 2, the Master I2C sends Sensor Interface a write signal by setting bit 0 of the 8-bit data with the higher 7 bit equal to the address of the Slave I2C interface, i.e., 0x67. In Step 3, Sensor Interface sends an acknowledge signal to the Master I2C. In Step 4, the Master I2C sends the address of the control register corresponding to Channel 5, e.g., 0x14. Step 5, Sensor Interface through the slave I2C interface sends acknowledgement back to the Master I2C. Step 6, the Master I2C sends stop condition to complete the selection of Channel 5.

Gain Selection

In some embodiments according to the present invention, the sensor interface is capable of providing multiple selectable fixed gains within a predefined voltage range. For example, a sensor interface according to the present invention may offer 8 selectable fixed gains ranging from 2V/V to 760V/V. When the Sensor Interface is powered-up, the gain is at a default value, e.g., 2V/V. The actual desired gain can be selected via I2C through a Gain Select register. The example below illustrates how to select a gain of 150V/V, assuming a register with address 0x06 is used as the Gain Select register.

To start communication with the Sensor Interface, steps 1-3 as discussed above with respect to input and output selection are repeated. Step 4, the microcontroller sends address of register to access Gain Select register 0x06. Step 5, Sensor Interface sends acknowledgement. Since the Gain Select register is accessed, the Sensor Interface expects another byte of data from the master to complete the command. Bits 0-2 of the data byte can be used to select one of the eight pre-defined gains. As an example, Table 1 illustrates how a Gain Register can be configured for a set of predefined gains. In this example, Bits 0-2 with a binary value of 100 corresponds to a gain of 150V/V. So in Step 6, the microcontroller sends a data byte of 0x04 which selects the Gain of 150V/V. In Step 7, Sensor Interface sends the microcontroller an acknowledgment. In Step 8, the microcontroller sends stop condition to Sensor Interface to complete the Gain selection.

TABLE 1

Gain Register

| Hex | Bit 2 | Bit 1 | Bit 0 | Gain |
|-----|-------|-------|-------|------|
| 0x00 | 0 | 0 | 0 | 2 |
| 0x01 | 0 | 0 | 1 | 20 |
| 0x02 | 0 | 1 | 0 | 40 |
| 0x03 | 0 | 1 | 1 | 80 |
| 0x04 | 1 | 0 | 0 | 150 |
| 0x05 | 1 | 0 | 1 | 300 |
| 0x06 | 1 | 1 | 0 | 600 |
| 0x07 | 1 | 1 | 1 | 760 |

Offset Correction

In some embodiments according to the present invention, the Sensor Interface has an offset correction DAC that can be used to provide digital calibration on each channel of the multiple channels of inputs. Only the offset voltage of the active channel is applied to the PGA. Using the Sensor Interface depicted in FIG. 2 as an example, the offset correction DAC is a 10-bit DAC that provides an offset voltage to only the active channels of the 16 inputs.

The DAC offset of each channel is controlled by the I2C compatible interface (e.g., 203 of FIG. 2). One DAC offset register is used for storing DAC offset of each channel. At any time, the master I2C can read or write to any of the DAC offset registers.

As an example, the DAC offset for each channel can be set via I2C using the register addresses 0x20 thru 0x2F followed by another two bytes of data to set the polarity and value of the offset voltage. In this same example, a ±560 mV offset correction range is available. The full range of the DAC offset is only available at a gain of 2. At higher gains, the output voltage range of The Sensor Interface will be exceeded if the full range of the 10-bit DAC offset is used. The internal 10-bit DAC allows 1,024 different offset voltage settings between 0 mV and 560 mV. The polarity of the offset correction is set with an additional bit. The unit offset is determined by the following equation:

$$\text{Unit Offset} = \frac{\text{Total Offset}}{DAC \text{ output Levels}} = \frac{560 \text{ mV}}{1024} = 547 \text{ μV}$$

Table 2 below lists the content of a few example offset values for a 10-bit DAC offset register.

TABLE 2

| DAC | 10-bit DAC Range | | | | | | | | | | | |
|---|---|---|---|---|---|---|---|---|---|---|---|---|
| Sign D10 | D9 | D8 | D7 | D6 | D5 | D4 | D3 | D2 | D1 | D0 | Offset % FS Input | Voltage RTI |
| 0 | 1 | 1 | 1 | 1 | 1 | 1 | 1 | 1 | 1 | 1 | 50 | +560 mV |
| 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | −50 | −560 mV |
| 1 | 0 | 0 | 0 | 0 | 0 | 0 | 0 | 0 | 0 | 0 | 0 | 0 |

Specifically, if the content of the 10-Bit DAC register contains 0x00 (hex), a 0 mV offset is applied to the corresponding active data input channel. If the content of the 10-Bit DAC register contains 0x3FF (hex), a +560 mV offset is applied to the corresponding active data input channel. If the content of the 10-Bit DAC register contains 0x7FF (hex), a −560 mV offset is applied to the corresponding active data input channel, Each DAC output level provides an additional 547 μV of offset. For the same example, the following equation can be used to determine what DAC output level corresponds to a specific desired offset:

$$X = \frac{\text{Desired Offset}}{\text{Unit Offset}}$$

As an example, the following procedures illustrate how to set the DAC offset for input channel 7 to a value of 75 mV.

To start communication with The Sensor Interface, steps 1-3 as discussed above in the Inputs and Input Selection are repeated. In Step 4, the microcontroller (Master I2C interface) sends address of a DAC offset register to access. Following the same example above, the DAC offset register for input Channel 7 has a register address of 0x26, Therefore, the data byte sent is 0x26. In Step 5, Sensor Interface sends an acknowledgement to the microcontroller/master I2C.

Since a DAC Offset register was accessed, The Sensor Interface is expecting another two bytes of data from the microcontroller or master I2C interface to complete the command. As shown in Table 2 above, D0 thru D9 are used to set the offset voltage and D10 is used to set the sign of the offset voltage, 0=positive and 1=negative.

To determine what DAC output level corresponds to 75 mV, use the following equation:

$$DAC \text{ Output Level} = \frac{\text{Desired Offset}}{\text{Unit Offset}} = \frac{75 \text{ mV}}{547 \text{ μV}} = 137$$

So, a decimal value of 137 corresponds to 75 mV. Therefore, a hex value 0x89 or a binary value 00010001001 in the DAC offset register would apply a +75 mV offset, a hex value 0x489 or a binary value 10010001001 in the DAC offset register would apply a −75 mV offset.

In Step 6, the microcontroller/master I2C sends 1st byte of DAC offset register data to select and offset of +75 mV, i.e., the 2MSBs of 10-bit DAC output level that corresponds to 137 (0x89). In Step 7, the Sensor Interface sends an acknowledgment to the microcontroller/master I2C.

In Step 8, the microcontroller/master I2C sends $2^{nd}$ byte of DAC offset register data to select an offset of +75 mV. In Step 9, the Sensor Interface sends an acknowledgment to the microcontroller/master I2C. In Step 10, the microcontroller/master I2C sends a stop condition to complete the selection of the desired offset for DAC correction for a specific input channel, i.e., +75 mV for channel 7.

It should be noted that how the DAC connects to the PGA for effecting offset as shown in FIG. 2 is one of the advantages the present invention has over the conventional approaches. In a traditional IA reference pin would need to be used to adjust offset. This aspect of the invention allows the sensor interface design to be more integrated with a lower noise as well as a smaller footprint.

Figure 4:
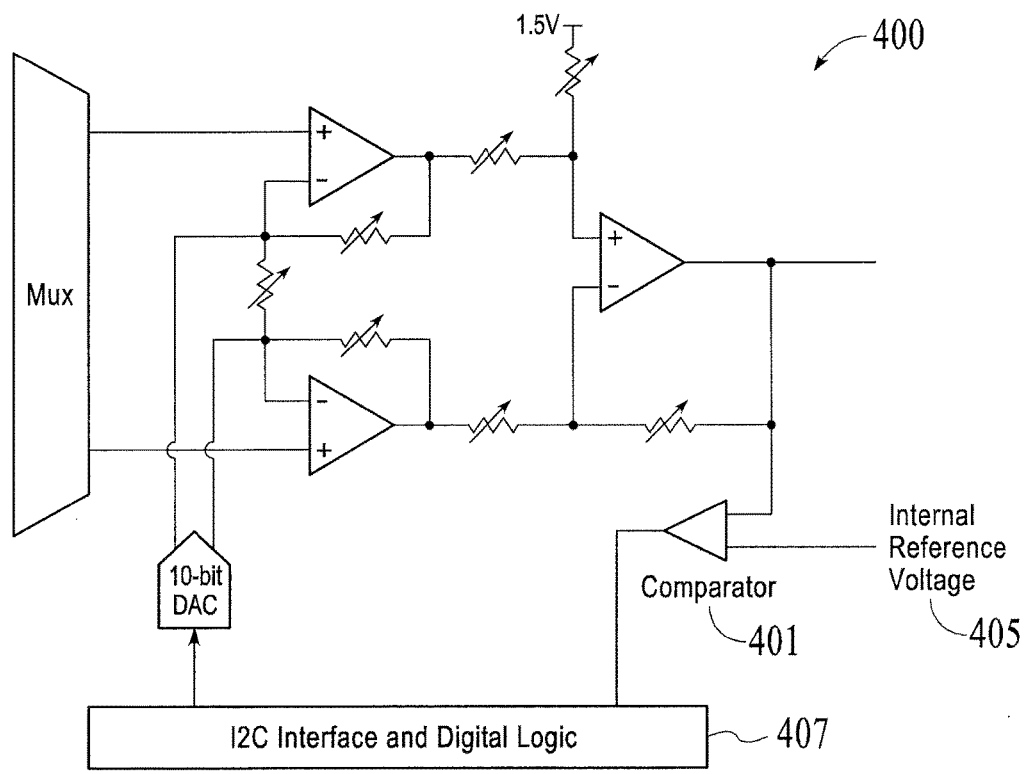
FIG. 4 is a block diagram of an embodiment of a sensor interface according to another aspect of the invention.

FIG. 4 depicts a block diagram of an embodiment of a sensor interface according to another aspect of the invention. Compared to the sensor interface as depicted in FIG. 2, the sensor interface here (400) has a comparator (401) that compares the output signal for the PGA (403) to an "internal reference voltage" (405) and provides the comparison result to a logic circuitry (not shown). Although FIG. 4 does not depicts where such logic circuitry is implemented, it should be apparent to a person skilled in the art that the logic circuitry can be implemented at various locations, such as within I2C Interface and Digital Logic (407), as a separate component outside of the I2C Interface and Digital Logic (407), as between Offset DAC (409) and PGA 403, or in any combination of these locations.

As described above, the offset correction in Sensor Interface 200 still requires the involvement of the user/external microprocessor, whereby the offset is measured off Sensor Interface 200, the DAC setting is then calculated off Sensor Interface 200 and the offset values are then written into the DAC offset registers of Sensor Interface 200. Unlike Sensor Interface 200, Sensor Interface 400 allows the measurement of the offset and calculation of the offset values carried out automatically and internally through just a command from the user/external microprocessor.

Specifically, by adding Comparator 401 on the output and the logic circuitry (not shown), the external microprocessor simply sends a command to Sensor Interface 400 to initiate offset calibration. Then the logic circuitry would begin counting up the DAC offset based on the comparison result of Comparator 401 when the PGA output is lower than the desired reference voltage 405. Conversely, the logic circuitry would begin counting down the DAC offset based on the comparison result of Comparator 401 when the PGA output is higher than the desired reference voltage 405. It should be noted that although FIG. 4 shows that the reference voltage 405 labeled as "Internal Reference" is internally provided (e.g., 2V), the desired reference voltage 405 may be externally applied.

When the PGA output has reached the desired value, the counting up (or counting down) is shut off and the register value then counted is stored for the corresponding desired reference voltage. There are many different implementations of the logic circuitry for purposes of counting up and counting down that are well known in the art and will not be described here for brevity.

LDO Enable/Select (Power to External Bridge Sensors)

In some embodiments according to the present invention, the Sensor Interface includes an on-chip low dropout regulator (LDO) that provides one or more regulated voltages that can be used to power external input bridge sensors. For example, a sensor interface may provide two voltage options, e.g., 3V and 2.65V.

In one implementation, the LDO voltage can be selected via the I2C compatible two-wire serial interface. When The Sensor Interface is powered-up, the default LDO voltage is 3V. When The Sensor Interface is active (not in sleep mode), the LDO is always on. If the LDO voltage is not used, the LDO output can be left floating. When the Sensor Interface is in Sleep Mode, the LDO can either stay on or shut down. For example, the LDO can be set to shut down while the Sensor Interface is in Sleep Mode to save power. Alternatively, the LDO can be set to stay on while the Sensor Interface is in Sleep Mode to improve wake-up time.

Similar to the configuration of the various Sensor Interface control registers discussed above, the LDO voltage and disable setting can be selected via I2C by configuring the control register designated for a LDO voltage control. As an example, assuming the control register for the LDO voltage control has an address 0x07 and there are two voltage options to select from (e.g., 3V and 2.65V), the procedure to select a voltage of 2.65 v and keep the LDO enabled during Sleep Mode is described below.

To start communication with The Sensor Interface, steps 1-3 as discussed above in the Inputs and Input Selection are repeated. In Step 4, microcontroller/Master I2C sends address 0x07 to access the control register. In Step 5, Sensor Interface sends an acknowledgement.

After the LDO control register is accessed, the Sensor Interface is expecting another byte of data from the microcontroller/Master I2C to complete the command. As an example, and following the same convention discussed above, bit 0 and bit 1 of a data byte are used to select the LDO voltage and enable/disable the LDO during Sleep Mode. Bit 0 (D0) controls the LDO voltage (0: 3V; 1: 2.65V). Bit 1 (D1) is only applicable in Sleep Mode. Bit 1 controls whether the LDO shuts down or stays on during sleep mode (0: Enable; 1: Disable). When the sensor interface is active, the LDO is always on.

So in Step 6, the microcontroller/Master I2C sends code data 0x00 to select LDO voltage of 2.65 and Enable LDO during the Sleep Mode. In Step 7, the Sensor Interface sends an acknowledgement to the microcontroller. The microcontroller then sends stop condition to complete the LDO configuration.

Current Sense Mode (Monitoring the LDO Current)

As discussed above, in some embodiments of the invention, the Sensor Interface provides a Current Sense Mode, which can be activated via I2C using the corresponding control register, e.g., with an address 0x08. When activated, the LDO current is sensed and a proportional voltage is present at the output of The Sensor Interface (ILDO=VOUT/RL), The Current Sense Mode stays active until the Sensor Interface receives an input select command from the microcontroller.

Further, in some embodiments, the current sense mode can be used to monitor the change of the bridge impedance over time.

Sleep Mode (Analog Power Down)

In some embodiments of the Sensor Interface according to the invention, the Sleep Mode can be activated via I2C using the corresponding control register (e.g., with an address 0x05). When activated, The Sensor Interface will enter Sleep Mode. During Sleep Mode, the analog portion of The Sensor Interface is disabled. It should be noted that all register settings are retained during Sleep Mode.

In some embodiments, to save power, during the Sleep Mode, the nominal supply current will drop below a predefined current, e.g., below 70 µA with LDO on and below 45 µA with LDO off.

In some embodiments, the microcontroller/master I2C can read during sleep mode the value in any control register that stores a configuration value. During Sleep Mode, the only I2C command from the microcontroller that can be received or processed is a wake up command or the LDO on/off command. All other register addresses will be ignored. The wake up command is used to return to normal operation (exiting Sleep Mode) and can be written to a designated control register (e.g., 0x04).

It should become apparent from the discussion above that the sensor interface according to the present invention integrates many separate but required functions together on one chip for multiple sensor channels. As such, the present invention improves the sensor sensitivity and accuracy by providing more conditioning and calibration functions while reducing noises due to interconnect between different conditioning function blocks as well as the footprint on precious board real estate.

Although the description above refers to input signals from bridge sensors, the sensor interface according to the present invention can be used with many different types of sensors for different applications, such as pressure and temperature sensors, strain gauge amplifier, industrial process controls, and weigh scales.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed:

1. A programmable sensor interface for conditioning multiple sensor signals under the control of an external microprocessor, comprising:
   an input selection unit, wherein the input selection unit selects one or more sensor signals from a plurality of sensor signals according to an input selection control signal;
   an offset digital to analog converter (DAC), wherein the offset DAC is configured to generate an offset signal based on an offset control signal;
   a programmable gain amplifier (PGA), wherein one of the selected sensor signals is calibrated with the generated offset signal and the calibrated sensor signal is then amplified according to a PGA control signal; and
   a digital control interface unit, coupled to each of the input selection unit, the offset DAC, the PGA and the external microprocessor, for interfacing with the external microprocessor and generating the input selection control signal, the offset control signal and the PGA control signal.

2. The sensor interface of claim 1, wherein the input selection unit includes a multiplexer coupled to a plurality of sensor signals on the input side and selects one sensor signal according to the selection control signal.

3. The sensor interface of claim 2, wherein the multiplexer is a 16-to-1 differential multiplexer and the input selection control signal is a 16 bit data.

4. The sensor interface of claim 1, further comprising a plurality of offset registers for storing offset values, each offset register for a corresponding sensor signal.

5. The sensor interface of claim 1, wherein the data input of the offset DAC is coupled to the output of the input selection unit, the output of the offset DAC is coupled to the input of the PGA.

6. The sensor interface of claim 4, wherein the offset DAC is a 10-bit DAC that is configured to generate offset values with both polarity.

7. The sensor interface of claim 1, wherein the PGA is configured to provide a number of selectable gains to amplify the calibrated sensor signal.

8. The sensor interface of claim 1, further comprising a low dropout regulator (LDO) for providing regulated power supply bias to the multiple sensors.

9. The sensor interface of claim 8, wherein the LDO further includes a reference voltage and is capable of being turned off.

10. The sensor interface of claim 9, further comprising a 2 to 1 multiplexer that is coupled to the input selection unit, the reference voltage, the PGA and the digital control interface unit, wherein one of the input signal to the multiplexer is the output of the input selection unit and the other input signal to the multiplexer is a signal from the LDO, and wherein an active current sensing mode signal generated by the digital control interface unit causes a voltage proportional to the LDO current to be present at both the output of the multiplexer and the input of the PGA.

11. The sensor interface of claim 1, further comprising an analog to digital converter (ADC) for converting the analog output signal of the PGA to digital output.

12. The sensor interface of claim 1, wherein the digital control interface unit is a slave I2C serial digital interface.

13. The sensor interface of claim 4, further comprising:
   a comparator unit coupled to the output of the PGA and the digital control interface unit, wherein the comparator logic compares the output of the PGA to a desired reference signal and automatically performs offset correction for the selected sensor signal.

14. The sensor interface of claim 13, wherein the comparator unit causes a counter corresponding to the selected sensor signal to count up or count down based on the comparison result of the PGA output and the desired reference signal, and to stop counting and store the value of the counter into the offset register for the selected sensor signal when the PGA output matches the desired reference signal.

* * * * *